United States Patent
Patterson et al.

(10) Patent No.: US 11,603,045 B2
(45) Date of Patent: Mar. 14, 2023

(54) VEHICLE TAILGATE ASSEMBLY

(71) Applicant: GM GLOBAL TECHNOLOGY OPERATIONS LLC, Detroit, MI (US)

(72) Inventors: Derek L. Patterson, Shelby Township, MI (US); Neil W. Humann, Clinton Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 293 days.

(21) Appl. No.: 17/032,445

(22) Filed: Sep. 25, 2020

(65) Prior Publication Data
US 2022/0097608 A1    Mar. 31, 2022

(51) Int. Cl.
*B60R 3/02* (2006.01)
*B62D 33/03* (2006.01)

(52) U.S. Cl.
CPC ............... *B60R 3/02* (2013.01); *B62D 33/03* (2013.01)

(58) Field of Classification Search
CPC .................................. B60R 3/02; B62D 33/03
See application file for complete search history.

(56) References Cited

U.S. PATENT DOCUMENTS

| | | | | |
|---|---|---|---|---|
| 6,905,157 B2* | 6/2005 | Kang | ................. | B62D 33/0273 296/57.1 |
| 7,234,750 B1* | 6/2007 | Doolittle | ................... | B60R 3/02 296/57.1 |
| 8,201,869 B1* | 6/2012 | Butlin, Jr. | ................. | B60R 3/02 296/57.1 |
| 9,463,746 B2* | 10/2016 | Butlin, Jr. | ............... | B62D 33/03 |
| 9,902,328 B1* | 2/2018 | Mazur | ....................... | B60R 3/02 |
| 9,988,103 B1* | 6/2018 | Mouch | ............... | B62D 33/0273 |
| 9,994,263 B1* | 6/2018 | Richter | .................... | B60P 1/435 |
| 10,661,842 B2* | 5/2020 | Povinelli | .............. | B60Q 1/2661 |
| 10,994,660 B2* | 5/2021 | Ngo | .................... | B62D 33/0273 |
| 11,214,318 B1* | 1/2022 | Parker | ......................... | B60J 5/12 |
| 11,242,097 B1* | 2/2022 | Gross, IV | ................ | H04R 5/02 |
| 2007/0075560 A1* | 4/2007 | Katterloher | ............... | B60R 3/02 296/50 |
| 2012/0126564 A1* | 5/2012 | Hausler | .............. | B62D 33/0273 296/57.1 |

(Continued)

FOREIGN PATENT DOCUMENTS

DE     102021114674 A1 * 12/2021  ............... B60R 3/02
DE     102021115039 A1 * 12/2021  ......... B62D 33/0273

*Primary Examiner* — Jacob B Meyer
(74) *Attorney, Agent, or Firm* — Quinn IP Law

(57) ABSTRACT

A tailgate assembly includes a first panel portion rotatably couplable to a vehicle body and pivotable between a closed position and an open position, a second panel portion rotatably coupled to the first panel portion and pivotable between a first position and a second position. The second panel portion is extendable relative to the first panel portion between a retracted position and an extended position. The tailgate assembly includes a third panel portion rotatably coupled to the second panel portion and pivotable between a stowed position and a use position. The third panel portion extends generally parallel with the second panel portion when the third panel portion is in the stowed position and the third panel portion extends generally perpendicular to the second panel portion when the third panel portion is in the use position.

20 Claims, 6 Drawing Sheets

(56) References Cited

U.S. PATENT DOCUMENTS

| | | | | |
|---|---|---|---|---|
| 2016/0075286 | A1* | 3/2016 | Butlin, Jr. | B62D 33/03 |
| | | | | 296/50 |
| 2016/0311355 | A1* | 10/2016 | Krajenke | B62D 33/0273 |
| 2017/0274940 | A1* | 9/2017 | Povinelli | B62D 33/0273 |
| 2017/0291551 | A1* | 10/2017 | Krajenke | B62D 33/0273 |
| 2017/0320419 | A1* | 11/2017 | Gobart | B60N 3/02 |
| 2019/0054961 | A1* | 2/2019 | Ngo | B60R 3/02 |
| 2019/0389388 | A1* | 12/2019 | Ngo | B60R 3/02 |
| 2021/0039722 | A1* | 2/2021 | Williamson | B62D 33/0273 |
| 2021/0155296 | A1* | 5/2021 | Povinelli | B60R 7/005 |
| 2021/0221448 | A1* | 7/2021 | Hung | B62D 33/0273 |
| 2021/0380175 | A1* | 12/2021 | Jarjoura | B60R 3/02 |
| 2021/0387680 | A1* | 12/2021 | Parker | B62D 33/0273 |
| 2021/0402929 | A1* | 12/2021 | Robinson | B62D 33/0273 |
| 2021/0403097 | A1* | 12/2021 | Gase | E05F 15/605 |
| 2022/0097608 | A1* | 3/2022 | Patterson | B62D 33/0273 |
| 2022/0119046 | A1* | 4/2022 | Parker | B62D 33/0273 |

* cited by examiner

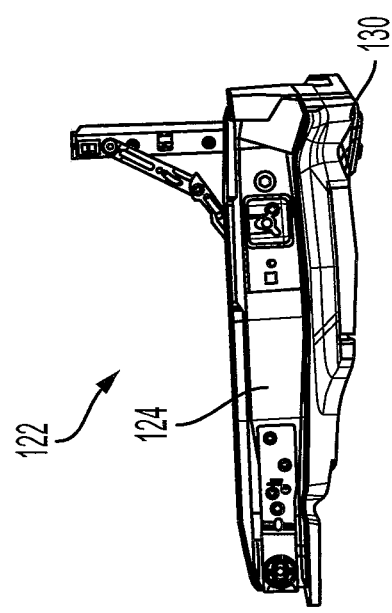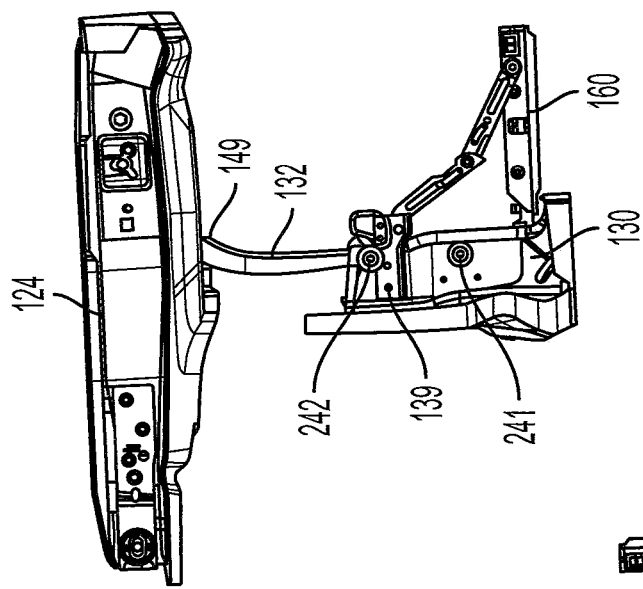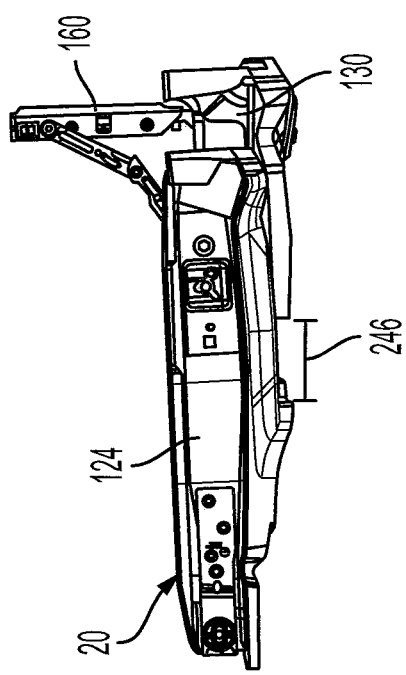

VEHICLE TAILGATE ASSEMBLY

INTRODUCTION

The present disclosure relates generally to a tailgate assembly for a vehicle.

Pickup trucks offer a relatively large amount of cargo space, most of which is in a truck bed. However, at times, an operator may desire additional cargo space. Typically, the truck bed is accessible by opening a pivotable tailgate at the rear of the truck bed.

SUMMARY

Embodiments according to the present disclosure provide a number of advantages. For example, embodiments according to the present disclosure enable multiple positions of a tailgate assembly. In some positions, the tailgate assembly extends a cargo area of the vehicle.

In one aspect of the present disclosure, a tailgate assembly includes a first panel portion rotatably couplable to a vehicle body and pivotable between a closed position and an open position with respect to the vehicle body. The tailgate assembly also includes a second panel portion rotatably coupled to the first panel portion and pivotable between a first position and a second position. The second panel portion is generally parallel with the first panel portion when the first panel portion is in the closed position and the second panel portion is extendable relative to the first panel portion between a retracted position and an extended position. The tailgate assembly also includes a third panel portion rotatably coupled to the second panel portion and pivotable between a stowed position and a use position. The third panel portion extends generally parallel with the second panel portion when the third panel portion is in the stowed position and the third panel portion extends generally perpendicular to the second panel portion when the third panel portion is in the use position.

In some aspects, the tailgate assembly and the vehicle body define a first cargo area when the first panel portion is in the closed position.

In some aspects, the tailgate assembly and the vehicle body define a second cargo area when the first panel portion is in the open position, the second panel portion is in the retracted position and generally parallel to the first panel portion, and the third panel portion is in the use position.

In some aspects, the tailgate assembly and the vehicle body define a third cargo area when the first panel portion is in the open position, the second panel portion is in the extended position and generally parallel to the first panel portion, and the third panel portion is in the use position, and the third cargo area is larger than the first and the second cargo areas.

In some aspects, the tailgate assembly further includes a hinge assembly configured to permit the second panel portion to be pivoted to the second position and permit the second panel portion to be movable between the retracted position and the extended position.

In some aspects, the hinge assembly includes a first hinge portion, a second hinge portion rotatably coupled to the first hinge portion, and a slidable member slidable relative to the second hinge portion between a first hinge position correlating to the retracted position of the second panel portion and a second hinge position correlating to the extended position of the second panel portion.

In some aspects, the second hinge portion includes a first receiving member and a second receiving member parallel to the first receiving member. The first and second receiving members define an opening configured to receive the slidable member.

In some aspects, the first receiving member includes a first slot, the second receiving member includes a second slot parallel to the first slot, and the hinge assembly includes an adjustment member. The adjustment member extends through the first slot, the slidable member, and the second slot such that the adjustment member translates within the first and second slots as the slidable member translates relative to the second hinge portion between the first hinge position and the second hinge position.

In some aspects, the hinge assembly includes a locking mechanism configured to retain the slidable member in one or more positions relative to the second hinge portion.

In some aspects, the locking mechanism is configured to releasably retain the slidable member in the first hinge position and releasably retain the slidable member in the second hinge position.

In another aspect of the present disclosure, an automotive vehicle includes a vehicle body including a first sidewall and a second sidewall generally parallel to the first side wall, a floor extending between the first and second sidewalls, and a tailgate assembly. The tailgate assembly includes a first panel portion rotatably coupled to the floor to at least partially define a first cargo area with the first and second sidewalls and the floor when the first panel portion is in a closed position. The tailgate assembly also includes a second panel portion rotatably coupled to the first panel portion and pivotable in a first direction of rotation from a first position in which the second panel portion is generally parallel with the first panel portion to a second position in which the second panel portion is generally perpendicular to the first panel portion and the second panel portion is extendable relative to the first panel portion between a retracted position and an extended position. The tailgate assembly also includes a third panel portion rotatably coupled to the second panel portion and pivotable between a stowed position in which the third panel portion extends generally parallel with the second panel portion and a use position in which the third panel portion extends generally perpendicular to the second panel portion.

In some aspects, the tailgate assembly and the vehicle body define a second cargo area when the first panel portion is in an open position, the second panel portion is in the retracted position and generally parallel to the first panel portion, and the third panel portion is in the use position.

In some aspects, the tailgate assembly and the vehicle body define a third cargo area when the first panel portion is in the open position, the second panel portion is in the extended position and generally parallel to the first panel portion, and the third panel portion is in the use position, and the third cargo area is larger than the first and the second cargo areas.

In some aspects, the automotive vehicle further includes a hinge assembly configured to permit the second panel portion to be pivoted to the second position and permit the second panel portion to be movable between the retracted position and the extended position.

In some aspects, the hinge assembly includes a first hinge portion, a second hinge portion rotatably coupled to the first hinge portion, and a slidable member. The slidable member is slidable relative to the second hinge portion between a first hinge position correlating to the retracted position of the second panel portion and a second hinge position correlating to the extended position of the second panel portion.

In another aspect of the present disclosure, a tailgate assembly includes a first panel portion rotatably couplable to a vehicle body and pivotable between a closed position and an open position with respect to the vehicle body. The tailgate assembly also includes a second panel portion including a first striker and a second striker, the second panel rotatably coupled to the first panel portion and pivotable between a first position and a second position. The second panel portion is extendable relative to the first panel portion between a retracted position and an extended position. The tailgate assembly also includes a hinge assembly including a first hinge portion, a second hinge portion rotatably coupled to the first hinge portion, and a slidable member translatable relative to the second hinge portion between a first hinge position correlating to the retracted position of the second panel portion and a second hinge position correlating to the extended position of the second panel portion. The tailgate assembly also includes a latch assembly including a release lever connected with a latch that engages the first striker when the second panel portion is in the retracted position and engages the second striker when the second panel portion is in the extended position. The tailgate assembly also includes a third panel portion rotatably coupled to the second panel portion and pivotable between a stowed position and a use position. The third panel portion extends generally parallel with the second panel portion when the third panel portion is in the stowed position and the third panel portion extends generally perpendicular to the second panel portion in the use position.

In some aspects, the tailgate assembly and the vehicle body define a first cargo area when the first panel portion is in the closed position.

In some aspects, the tailgate assembly and the vehicle body define a second cargo area when the first panel portion is in the open position, the second panel portion is in the retracted position and generally parallel to the first panel portion, and the third panel portion is in the use position.

In some aspects, the tailgate assembly and the vehicle body define a third cargo area when the first panel portion is in the open position, the second panel portion is in the extended position and generally parallel to the first panel portion, and the third panel portion is in the use position, and the third cargo area is larger than the first and the second cargo areas.

In some aspects, the tailgate assembly further includes a locking mechanism configured to releasably retain the slidable member in the first hinge position and releasably retain the slidable member in the second hinge position.

BRIEF DESCRIPTION OF THE DRAWINGS

The present disclosure will be described in conjunction with the following figures, wherein like numerals denote like elements.

FIG. 4 is a side view illustration of a tailgate assembly with the first panel portion in an open position, the second panel portion in a first, retracted position, and the third panel portion in a use position, according to an embodiment.

FIG. 5 is a side view illustration of a tailgate assembly with the first panel portion in an open position, the second panel portion in a second, extended position, and the third panel portion in a use position, according to an embodiment.

FIG. 6 is a side view illustration of a tailgate assembly with the first panel portion in an open position, the second panel portion in a first, extended position, and the third panel portion in a use position, according to an embodiment.

Figure 1:
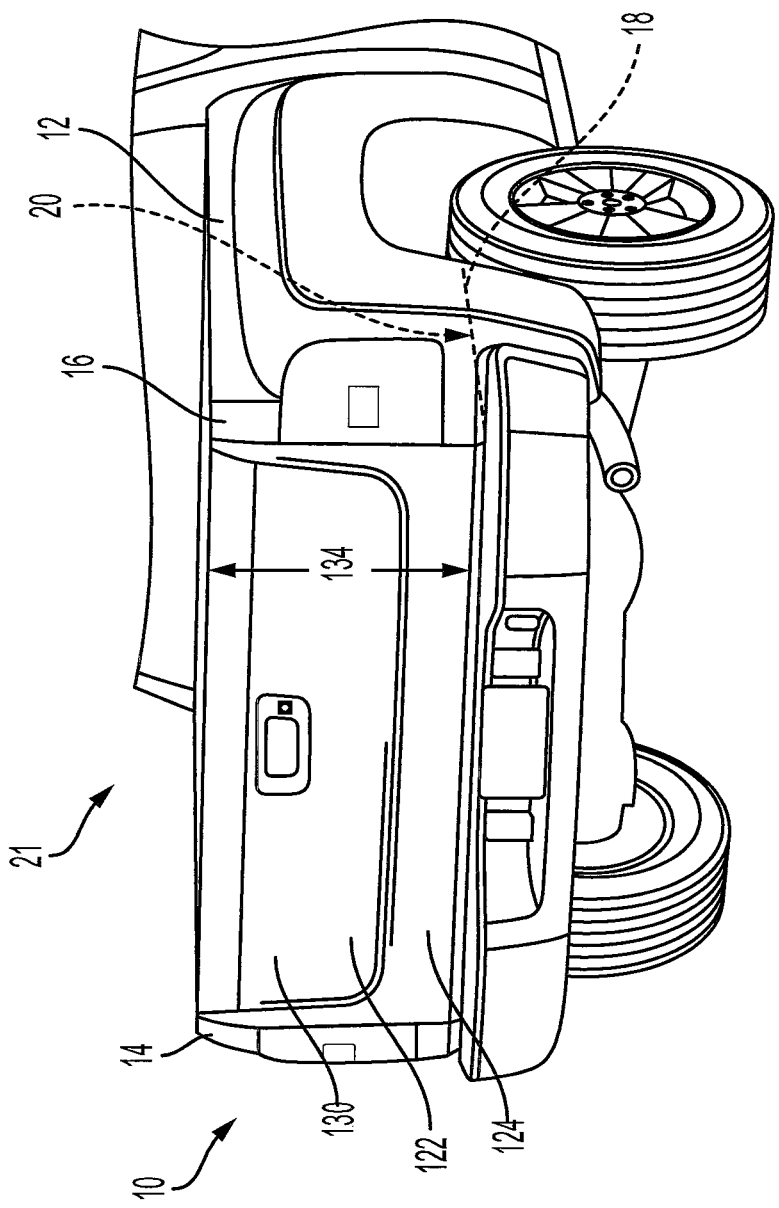
FIG. 1 is a schematic perspective partial illustration of a vehicle with a tailgate assembly, according to an embodiment.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

Referring to the drawings, wherein like reference numbers refer to like components throughout the several views, FIG. 1 shows a portion of a vehicle 10. The vehicle 10 has a vehicle body 12 that includes a first sidewall 14, a second sidewall 16, and a floor 18 (shown only in phantom and extending between the sidewalls 14, 16 to provide a first loading surface 20 for cargo).

Figure 2:
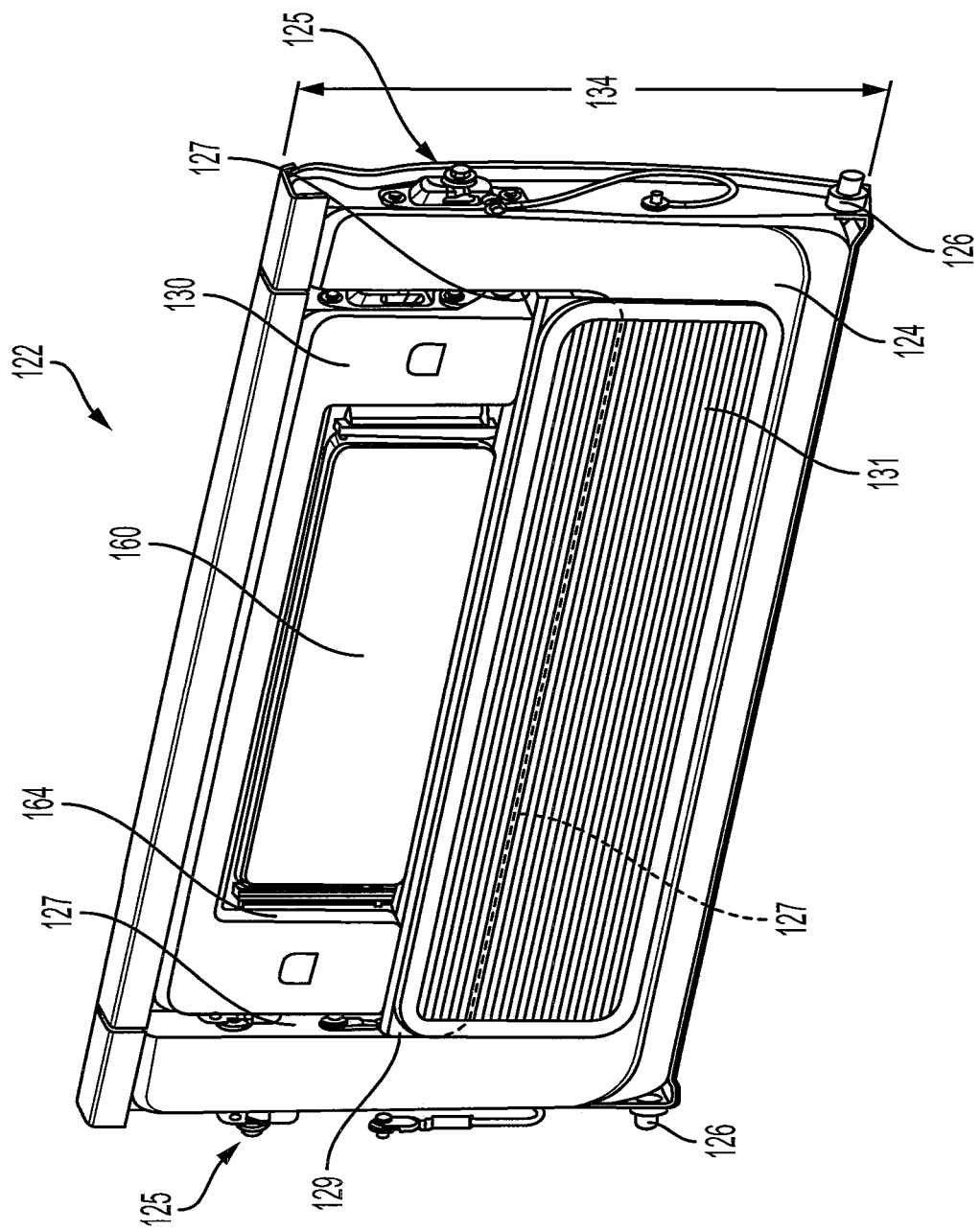
FIG. 2 is a schematic perspective illustration of a tailgate assembly, according to an embodiment.

The vehicle 10 includes a tailgate assembly 122 shown in a closed position in FIGS. 1 and 2 and an open position in FIGS. 3-8. The vehicle 10 is a pickup configuration, but the claimed invention is not limited to a pickup-type vehicle. The tailgate assembly 122, sidewalls 14, 16 and floor 18 partially define a cargo space 21 for storing cargo. As further described below, the tailgate assembly 122 has multiple hinges allowing different portions of the tailgate assembly 122 to be positioned in various configurations to ease access to the cargo space 21, to provide a step for accessing the cargo space 21, to extend the cargo space 21 of the vehicle 10, and to potentially reduce aerodynamic drag. The embodiment shown in FIG. 1 illustrates the tailgate assembly 122 when a first panel portion is in a closed position, defining a first cargo area.

FIG. 2 shows an embodiment of a tailgate assembly 122 that may be pivotably connected to the vehicle 10 of FIG. 1. FIG. 2 shows the side of the tailgate assembly 122 that would face the cargo area or space 21 of FIG. 1 if installed on the vehicle 10 of FIG. 1. The tailgate assembly 122 includes a first panel portion 124 that may be pivotably connected to the vehicle body 12 of FIG. 1 at hinges 126. One hinge 126 is obscured in FIG. 3 and is substantially identical to the hinge 126 shown. The first panel portion 124 may be in a closed position, as in FIG. 2, and may be pivoted to an open position. In the open position of FIG. 3, the first panel portion 124 would be generally parallel to and flush with the floor 18 of the vehicle 10 to extend the first loading surface 20 of the cargo area 21 of the vehicle 10. A flexible connector cable 128 at one or both sides of the first panel portion 124 connects to the vehicle body 12 of FIG. 1.

Figure 3:
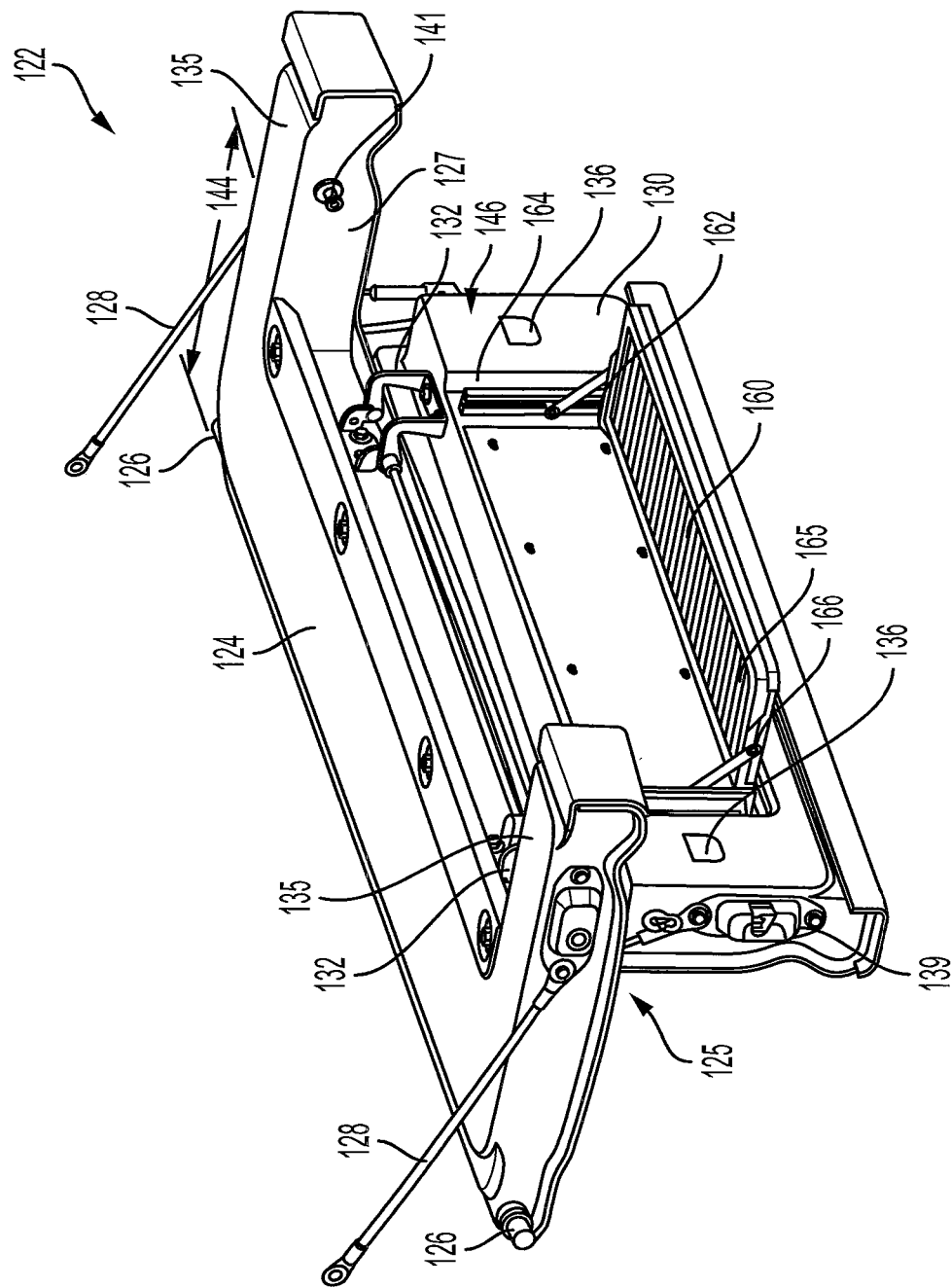
FIG. 3 is a schematic perspective illustration of a tailgate assembly with the first panel portion in an open position, the second panel portion in a second, retracted position, and the third panel portion in a use position, according to an embodiment.

With continued reference to FIGS. 2 and 3, the first panel portion 124 forms a generally U-shaped recess 127 in which a second panel portion 130 is hinged to the first panel portion 124 at hinge 132. Another identical hinge 132 is at the other end of the recess and is partially obscured in FIG. 3. The U-shaped recess 127 is partially obscured by a retainer 129 and a tread 131 in FIG. 2 but is shown with hidden lines where obscured. In FIG. 2, the second panel portion 130 is in a first position in which it is generally parallel with the first panel portion 124. The tailgate assembly 122 has a first height 134 when the second panel portion 130 is in the first position. The first height 134 is defined as a distance from a lower edge of the first panel portion 124 (i.e., the edge nearest the floor 18 of the vehicle 10 of FIG. 1 when installed on the vehicle 10) to an edge of the second portion 130 that would be furthest from the floor 18.

With reference to FIG. 3, the second panel portion 130 may be pivoted at the hinge 132 to a second position in which it is generally perpendicular to the first panel portion 124. This allows the tailgate assembly 122 to have a second height 144 at the recess 127 that is less than the first height 134. The second height 144 is defined as the distance from the lower edge of the first panel portion 124 to a surface 146 of the second panel portion 130. The first panel portion 124 forms two posts 135 at lateral ends of the first panel portion 124 on either side of the recess 127. At the posts 135, the first panel portion 124 still has the first height 134 regardless of the position of the second panel portion 130. Because latch assemblies are conventionally located at the sides of a tailgate, latch assemblies 125 on either side of the first panel portion 124 at the posts 135 may be used that are identical to the location of latch assemblies on a vehicle with a conventional tailgate. Accordingly, the tailgate assembly 122 may be especially advantageous in that it may be easily retrofitted to a vehicle and make use of the same latch assemblies.

A third panel portion 160 is pivotably connected to the second panel portion 130 at a pair of hinges 162 (one shown in FIG. 3, with the other being substantially identical and laterally spaced on the second panel portion 130). The third panel portion 160 is shown in a stowed position in FIG. 2 in which it is generally parallel with the second panel portion 130 and the first panel portion 124 and is nested in a recess 164 defined by the second panel portion 130. The third panel portion 160 is hinged to the second panel portion 130 at the hinge 162 and may be pivoted to a use position shown in FIG. 3 in which it is generally perpendicular to the second panel portion 130. Folding support arms 166 help support the third panel portion 160 in the use position. In the use position, with the second panel portion 130 in the second position and the first panel portion 124 in the open position, the third panel portion 160 is configured as a step for entry into the cargo space 21 of FIG. 1. The third panel portion 160 has a tread 165 used for a stepping surface as shown in FIG. 3.

To pivot the second panel portion 130 to the second position, an operator pulls the release levers 136 that release the latch assemblies 139 mounted to the sides of the second portion 130 from the strikers 141 mounted to the posts 135 of the first portion 124. The latch assemblies 139 may be released simultaneously or one at a time. Only one latch assembly 139 and one striker 141 are visible in FIG. 3, but each side of the second panel portion 130 has a latch assembly 139, and each post 135 has a corresponding striker 141.

FIGS. 4-6 illustrate an extendable and pivotable tailgate assembly 122, according to an embodiment. The second panel portion 130 is pivotably and extendably coupled with the first panel portion 124 via the hinges 132. The hinges 132 include a first hinge portion 152 and a second hinge portion 155, as shown in one embodiment in FIGS. 7 and 8. The first hinge portion 152 attaches to the first panel portion 124 and the second hinge portion 155 is rotatably coupled to the first hinge portion 152 at a pivot point (not shown). The second hinge portion 155 includes a first receiving member 153 and a second receiving member 154. The second receiving member 154 is generally parallel to and spaced apart from the first receiving member 153.

Figure 8:
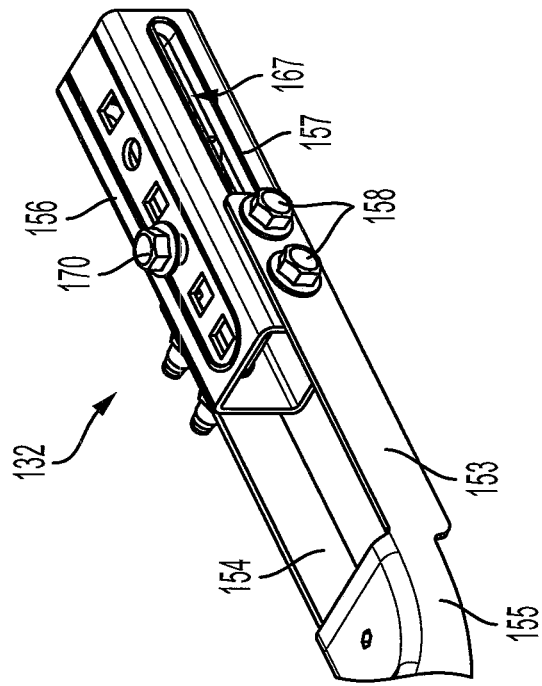
FIG. 8 is a perspective side view illustration of the hinge of FIG. 7 in an extended position, according to an embodiment.

The hinges 132 also include a slidable member 156. The slidable member 156 is slidable between the first and second receiving members 153, 154. An edge 157 defines a slot 167 in the slidable member 156. The slot 167 extends along a length of the slidable member 156 and is generally parallel to the first receiving member 153. While one slot 167 is shown in FIG. 8, it is understood that a similar slot 167 extends along the length of the slidable member 156 on the opposite side and is generally parallel to the second receiving member 154.

Figure 7:
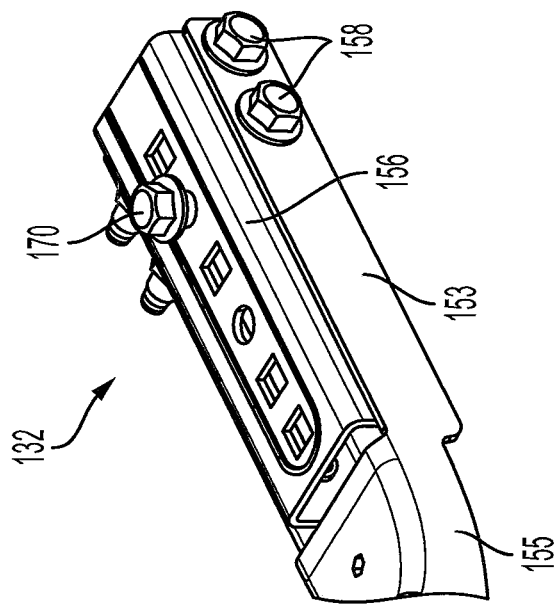
FIG. 7 is perspective side view illustration of a hinge for use with a tailgate assembly, with the hinge in a retracted position, according to an embodiment.

One or more coupling members 158 couple the slidable member 156 to the second hinge portion 155. The coupling member 158 extends through an opening in the first receiving member 153, passing through the slot 167 and extending through an opening in the second receiving member 154 such that the slidable member 156 is coupled with, but slidable relative to, the second hinge portion 155. Two coupling members 158 are shown in FIGS. 7 and 8, however it is understood that one or more coupling members 158 may be used to couple together the second hinge portion 155 and the slidable member 156. In various embodiments, the coupling member 158 is a mechanical fastener such as a bolt. In various embodiments, the coupling member 158 is a bolt used with one or more washers and a securing nut.

In various embodiments, the slidable member 156 includes one or more locking openings 159. The locking openings 159 are positioned on a side of the slidable member 156 perpendicular to the side of the slidable member 156 on which the slot 167 is located. A locking mechanism 170 extends through the locking opening 159 to secure the slidable member 156 in a retracted position, extended position, or a discrete position between the retracted and extended positions. The locking mechanism 170 is removable and positionable to discrete positions depending on the number and position of the locking openings 159. To position the slidable member 156 relative to the second hinge portion 155, the locking mechanism 170 is removed from the locking opening 159, the slidable member 156 is positioned by sliding the slidable member 156 to the desired location relative to the second hinge portion 155, and the locking mechanism 170 is inserted into the locking opening 159 to secure the slidable member 156 in the desired position. In various embodiments, the locking mechanism 170 is a mechanical fastener, such as a bolt.

Figure 9:
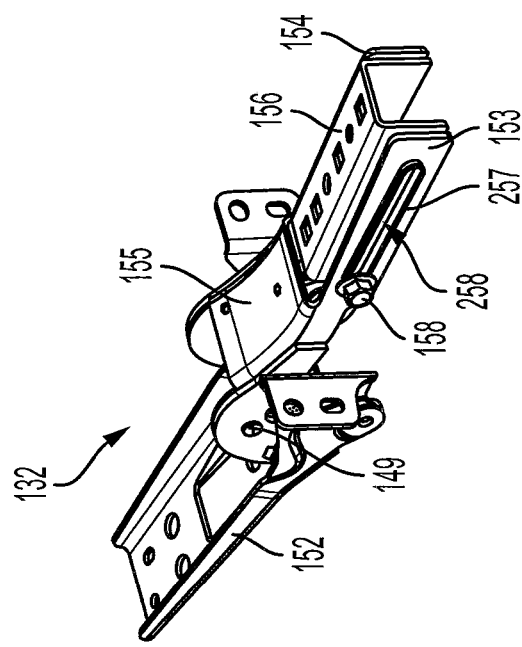
FIG. 9 is a perspective side view illustration of a hinge for use with a tailgate assembly, with the hinge in a retracted position, according to an embodiment.
Figure 10:
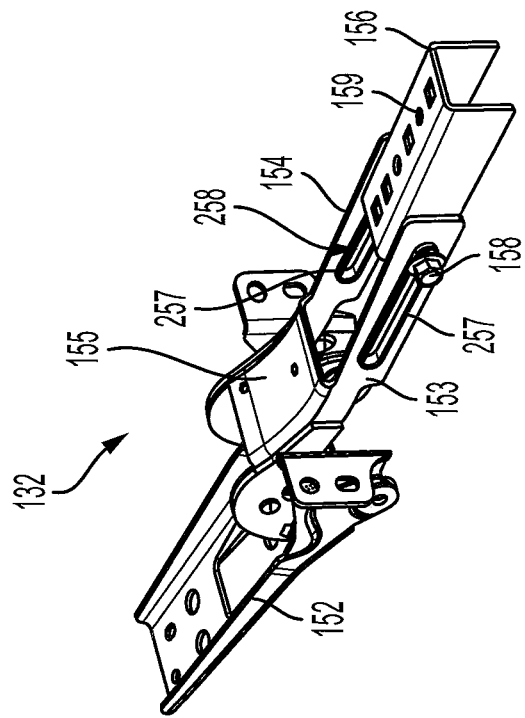
FIG. 10 is a perspective side view illustration of the hinge of FIG. 9 in an extended position, according to an embodiment.

Another embodiment of a hinge assembly 132 is shown in FIGS. 9 and 10. Similar to the embodiment shown in FIGS. 7 and 8, the hinges 132 include a first hinge portion 152 and a second hinge portion 155. The first hinge portion 152 attaches to the first panel portion 124 and the second hinge portion 155 is rotatably coupled to the first hinge portion 152 at a pivot point 149. The second hinge portion 155 includes a first receiving member 153 and a second receiving member 154. The second receiving member 154 is generally parallel to and spaced apart from the first receiving member 153.

The hinges 132 also include a slidable member 156. The slidable member 156 is slidable between the first and second receiving members 153, 154. In the embodiment illustrated in FIGS. 9 and 10, an edge 257 defines a slot 258 in the first receiving member 153. The slot 258 extends along a length of the first receiving member 153. As shown in FIG. 10, a similar slot 258 extends along the length of the second receiving member 154 on the opposite side of the slidable member 156.

One or more coupling members 158 couple the slidable member 156 to the second hinge portion 155. The coupling member 158 extends through the slot 258 in the first receiving member 153, passing through an opening in the slidable member 156, and extending through the slot 258 in the second receiving member 154 such that the slidable member 156 is coupled with, but slidable relative to, the second hinge portion 155. In various embodiments, the coupling member 158 is a mechanical fastener such as a bolt. In various embodiments, the coupling member 158 is a bolt used with one or more washers and a securing nut.

In various embodiments, the slidable member 156 includes one or more locking openings 159, as discussed with respect to FIGS. 7 and 8. While not shown in FIGS. 9 and 10, a locking mechanism, similar to the locking mechanism 170 discussed with respect to FIGS. 7 and 8, extends through the locking opening 159 to secure the slidable member 156 in a retracted position, extended position, or a discrete position between the retracted and extended positions. The locking mechanism is removable and positionable to discrete positions depending on the number and position of the locking openings 159.

With continued reference to FIGS. 4-6, the hinges 132 allow the second panel portion 130 to rotate with respect to the first panel portion 124 between a first position and a second position and also extend between a retracted position to an extended position with respect to the first panel portion 124. As shown in FIG. 5, in some embodiments, the latch assemblies 139 include a first striker 241 and a second striker 242. In the illustrated embodiment, the first and second strikers 241, 242 are mounted to the sides of the second panel portion 130. When the first and second strikers 241, 242 are mounted to the sides of the second panel portion 130, the latch assemblies 139 are mounted to the posts 135 of the first panel portion 124. While one set of first and second strikers 241, 242 is shown in FIG. 5, it is understood that a second set of first and second strikers 241, 242 is positioned on the opposite side of the second panel portion 130.

The first striker 241 engages with the latch assembly 139 when the second panel portion 130 is in the first position and retracted with respect to the first panel portion 124. To pivot the second panel portion 130 to the second position, an operator pulls the release levers 136 (shown in FIG. 3) that release the latch assemblies 139 from the first strikers 241.

To extend the second panel portion 130 to the extended position, an operator releases the locking mechanism 170 of the hinges 132, allowing the slidable member 156 to translate relative to the second hinge portion 155. The second panel portion 130 can then be rotated from the second position to the first position (about the pivot point 149 of the hinges 132) such that the second panel portion 130 is generally parallel to the first panel portion 124. The second strikers 242 engage with the latch assemblies 139 to secure the second panel portion in the second and extended position, as shown in FIG. 6. The translation of the slidable member 156 to the extended position extends the first cargo area 21 to a second cargo area that is larger than the first cargo area 21 by extending the first loading surface 20 by an extension length 246. Similarly, the second panel portion 130 can be returned to the retracted position by releasing the second strikers 242 from the latch assemblies 139, pivoting the second panel portion 130 to the second position, disengaging the locking mechanisms 170 of the hinges 132 to slide the slidable member 156 to the retracted position and engaging the locking mechanism 170 to secure the slidable member 156 in the retracted position. The second panel portion 130 can then be pivoted back to the first position generally parallel with the first panel portion 124 as described herein.

The first panel portion 124, the second panel portion 130, and the third panel portion 160 may be positioned in various combinations of positions. For example, when the first panel portion 124 is in the open position, the second panel portion 130 may be in the first position, and the third panel portion 160 may be in either the stowed or use position. When the first panel portion 124 is in the open position, the second panel portion 130 is in the first, retracted position, and the third panel portion 160 is in the use position, the tailgate assembly 122 defines a second cargo area (shown in FIG. 4) that is larger than the first cargo area illustrated in FIG. 1. In another combination, the first panel portion 124 is in the open position, the second panel portion 130 is rotated to the second position and extended to the extended position, and the third panel portion 160 may be in either the stowed or use position. In another combination, the first panel portion 124 is in the open position, the second panel portion 130 is rotated to the second position, extended to the extended position, and then rotated to the first, extended position, and the third panel portion 160 may be in either the stowed or use position. When the first panel portion 124 is in the open position, the second panel portion 130 is rotated to the second position, extended to the extended position, and then rotated to the first, extended position, and the third panel portion 160 is in the use position, the tailgate assembly 122 defines a third cargo area (shown in FIG. 6) that is larger than the first cargo area (shown in FIG. 1) and the second cargo area (shown in FIG. 4). The position combinations discussed herein are for example and other combinations of positions are also possible.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives and is not intended to limit the selection to only those listed alternatives or to only one of the listed alternatives at a time unless the context clearly indicates otherwise.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A tailgate assembly for a vehicle with a vehicle body, the tailgate assembly comprising:
    a first panel portion rotatably couplable to the vehicle body and pivotable between a closed position and an open position with respect to the vehicle body;
    a second panel portion rotatably coupled to the first panel portion and pivotable between a first position and a second position, wherein the second panel portion is generally parallel with the first panel portion when the first panel portion is in the closed position, and the second panel portion is slidably coupled to the first panel portion and rectilinearly translatable relative to the first panel portion between a retracted position and an extended position whereat the second panel portion is spaced from the first panel portion; and
    a third panel portion rotatably coupled to the second panel portion and pivotable between a stowed position and a use position, wherein the third panel portion extends generally parallel with the second panel portion when the third panel portion is in the stowed position and the third panel portion extends generally perpendicular to the second panel portion when the third panel portion is in the use position.

2. The tailgate assembly of claim 1, wherein the tailgate assembly and the vehicle body define a first cargo area when the first panel portion is in the closed position.

3. The tailgate assembly of claim 2, wherein the tailgate assembly and the vehicle body define a second cargo area when the first panel portion is in the open position, the second panel portion is in the retracted position and generally parallel to the first panel portion, and the third panel portion is in the use position, and the second cargo area is larger than the first cargo area.

4. The tailgate assembly of claim 3, wherein the tailgate assembly and the vehicle body define a third cargo area when the first panel portion is in the open position, the second panel portion is in the extended position and generally parallel to the first panel portion, and the third panel portion is in the use position, and the third cargo area is larger than the first and the second cargo areas.

5. The tailgate assembly of claim 1, further comprising a hinge assembly rotatably coupling and slidably coupling the second panel portion to the first panel portion, wherein the hinge assembly is configured to permit the second panel portion to be pivoted to the second position and permit the second panel portion to be slid rectilinearly between the retracted position and the extended position.

6. The tailgate assembly of claim 5, wherein the hinge assembly comprises a first hinge portion, a second hinge portion rotatably coupled to the first hinge portion, and a slidable member slidable relative to the second hinge portion between a first hinge position correlating to the retracted position of the second panel portion and a second hinge position correlating to the extended position of the second panel portion.

7. The tailgate assembly of claim 6, wherein the second hinge portion comprises a first receiving member and a second receiving member parallel to the first receiving member, and the first and second receiving members define an opening configured to receive the slidable member.

8. The tailgate assembly of claim 7, wherein the first receiving member includes a first slot, the second receiving member includes a second slot parallel to the first slot, and the hinge assembly comprises an adjustment member extending through the first slot, the slidable member, and the second slot such that the adjustment member translates within the first and second slots as the slidable member translates relative to the second hinge portion between the first hinge position and the second hinge position.

9. The tailgate assembly of claim 6, wherein the hinge assembly comprises a locking mechanism configured to retain the slidable member in one or more positions relative to the second hinge portion.

10. The tailgate assembly of claim 9, wherein the locking mechanism is configured to releasably retain the slidable member in the first hinge position and releasably retain the slidable member in the second hinge position.

11. An automotive vehicle, comprising:
a vehicle body including a first sidewall, a second sidewall generally parallel to the first side wall, and a floor extending between the first and second sidewalls; and
a tailgate assembly, comprising:
a first panel portion rotatably coupled to the vehicle body to at least partially define a first cargo area with the first and second sidewalls and the floor when the first panel portion is in a closed position;
a second panel portion rotatably coupled and slidably coupled to the first panel portion and pivotable in a first direction of rotation from a first position, in which the second panel portion is generally parallel with the first panel portion, to a second position, in which the second panel portion is generally perpendicular to the first panel portion, and the second panel portion is extendable relative to the first panel portion between a retracted position and an extended position;
a hinge assembly rotatably and slidably coupling the second panel portion to the first panel portion and comprising a first hinge portion, a second hinge portion rotatably coupled to the first hinge portion, and a slidable member translatable relative to the second hinge portion between a first hinge position, correlating to the retracted position of the second panel portion, and a second hinge position, correlating to the extended position of the second panel portion; and
a third panel portion rotatably coupled to the second panel portion and pivotable between a stowed position in which the third panel portion extends generally parallel with the second panel portion and a use position in which the third panel portion extends generally perpendicular to the second panel portion.

12. The automotive vehicle of claim 11, wherein the tailgate assembly and the vehicle body define a second cargo area when the first panel portion is in an open position, the second panel portion is in the retracted position and generally parallel to the first panel portion, and the third panel portion is in the use position.

13. The automotive vehicle of claim 12, wherein the tailgate assembly and the vehicle body define a third cargo area when the first panel portion is in the open position, the second panel portion is in the extended position and generally parallel to the first panel portion, and the third panel portion is in the use position, and the third cargo area is larger than the first and the second cargo areas.

14. The automotive vehicle of claim 11, wherein the tailgate assembly further comprises a locking mechanism configured to releasably lock the slidable member in the first hinge position and releasably lock the slidable member in the second hinge position.

15. The automotive vehicle of claim 11, wherein the second panel portion includes first and second strikers, and wherein the tailgate assembly further comprises a latch assembly including a release lever connected with a latch, the latch configured to engage the first striker when the second panel portion is in the retracted position and engage the second striker when the second panel portion is in the extended position.

16. A tailgate assembly, comprising:
a first panel portion rotatably couplable to a vehicle body and pivotable between a closed position and an open position with respect to the vehicle body;
a second panel portion including a first striker and a second striker, the second panel portion rotatably coupled to the first panel portion and pivotable between a first position and a second position, wherein the second panel portion is extendable relative to the first panel portion between a retracted position and an extended position;
a hinge assembly comprising a first hinge portion, a second hinge portion rotatably coupled to the first hinge portion, and a slidable member translatable relative to the second hinge portion between a first hinge position correlating to the retracted position of the second panel portion and a second hinge position correlating to the extended position of the second panel portion;
a latch assembly including a release lever connected with a latch that engages the first striker when the second panel portion is in the retracted position and engages the second striker when the second panel portion is in the extended position; and
a third panel portion rotatably coupled to the second panel portion and pivotable between a stowed position and a use position, wherein the third panel portion extends generally parallel with the second panel portion when the third panel portion is in the stowed position, and the third panel portion extends generally perpendicular to the second panel portion in the use position.

17. The tailgate assembly of claim 16, wherein the tailgate assembly and the vehicle body define a first cargo area when the first panel portion is in the closed position.

18. The tailgate assembly of claim 17, wherein the tailgate assembly and the vehicle body define a second cargo area when the first panel portion is in the open position, the second panel portion is in the retracted position and generally parallel to the first panel portion, and the third panel portion is in the use position.

19. The tailgate assembly of claim 18, wherein the tailgate assembly and the vehicle body define a third cargo area when the first panel portion is in the open position, the second panel portion is in the extended position and generally parallel to the first panel portion, and the third panel portion is in the use position, and the third cargo area is larger than the first and the second cargo areas.

20. The tailgate assembly of claim 16, wherein the tailgate assembly further comprises a locking mechanism configured to releasably retain the slidable member in the first hinge position and releasably retain the slidable member in the second hinge position.

* * * * *